United States Patent [19]

McDaniel et al.

[11] 4,364,841

[45] Dec. 21, 1982

[54] PHOSPHATE CONTAINING SUPPORT WITH ZEROVALENT CHROMIUM

[75] Inventors: Max P. McDaniel; Marvin M. Johnson, both of Bartlesville, Okla.

[73] Assignee: Phillips Petroleum Company, Bartlesville, Okla.

[21] Appl. No.: 221,759

[22] Filed: Dec. 31, 1980

[51] Int. Cl.$^3$ .............................. C08F 4/02; C08F 4/62
[52] U.S. Cl. .................................... 252/430; 252/428; 252/431 R; 526/129; 526/134; 526/156
[58] Field of Search ..................... 252/428, 430, 431 R

[56] References Cited

U.S. PATENT DOCUMENTS

| | | | |
|---|---|---|---|
| 2,840,551 | 6/1958 | Field et al. | 260/93.7 |
| 2,930,789 | 3/1960 | Kerber et al. | 260/94.9 |
| 2,985,640 | 5/1961 | Loeb | 260/94.9 |
| 3,157,712 | 11/1964 | Walker et al. | 260/683.15 |
| 3,328,380 | 6/1967 | Gluesenkamp et al. | 260/94.9 |
| 3,342,750 | 9/1967 | Kearby | 252/437 |
| 3,757,002 | 9/1973 | Karol | 252/430 X |
| 3,794,628 | 2/1974 | Bower | 252/431 R X |
| 3,806,500 | 4/1974 | Karol | 252/431 R X |
| 3,875,132 | 4/1975 | Kruse | 252/431 R X |
| 3,887,494 | 6/1975 | Dietz | 252/452 |
| 3,900,457 | 8/1975 | Witt | 252/451 X |
| 3,904,550 | 9/1975 | Pine | 252/437 |
| 4,118,340 | 10/1978 | Rekers | 252/431 R X |
| 4,173,548 | 11/1979 | Pullukat et al. | 252/430 |
| 4,219,444 | 8/1980 | Hill et al. | 252/431 P X |

FOREIGN PATENT DOCUMENTS

| | | |
|---|---|---|
| 845754 | 3/1977 | Belgium . |
| 1317734 | 5/1973 | United Kingdom . |
| 2017521 | 10/1979 | United Kingdom . |
| 1561756 | 2/1980 | United Kingdom . |
| 1561910 | 3/1980 | United Kingdom . |

*Primary Examiner*—Patrick Garvin

[57] ABSTRACT

In accordance with one embodiment of this invention, a zerovalent chromium compound is introduced onto an activated phosphate-containing support and utilized in conjunction with an organometal cocatalyst, such as a trialkylborane. In accordance with another embodiment of this invention, a phosphate-containing xerogel is formed by removing water from an aluminum phosphate-containing hydrogel by means of azeotropic distillation or washing with a volatile, water miscible organic compound, activated and thereafter zerovalent chromium is incorporated therewith. In other embodiments of this invention, a phosphate-containing support is formed by forming aluminum phosphate from an aluminum alkoxide or from a melt, or by phosphating silica or alumina, or by forming an aluminum phosphate/silica combination. A support thus formed is activated and a zerovalent chromium compound added. The resulting catalysts are capable of giving high melt index, broad molecular weight distribution polymer, which polymer also exhibits other deviations from typical olefin polymers including lower flexural modulus. The catalyst is ideally suited for forming olefin polymers such as ethylene and ethylene copolymers in a slurry system.

29 Claims, 1 Drawing Figure

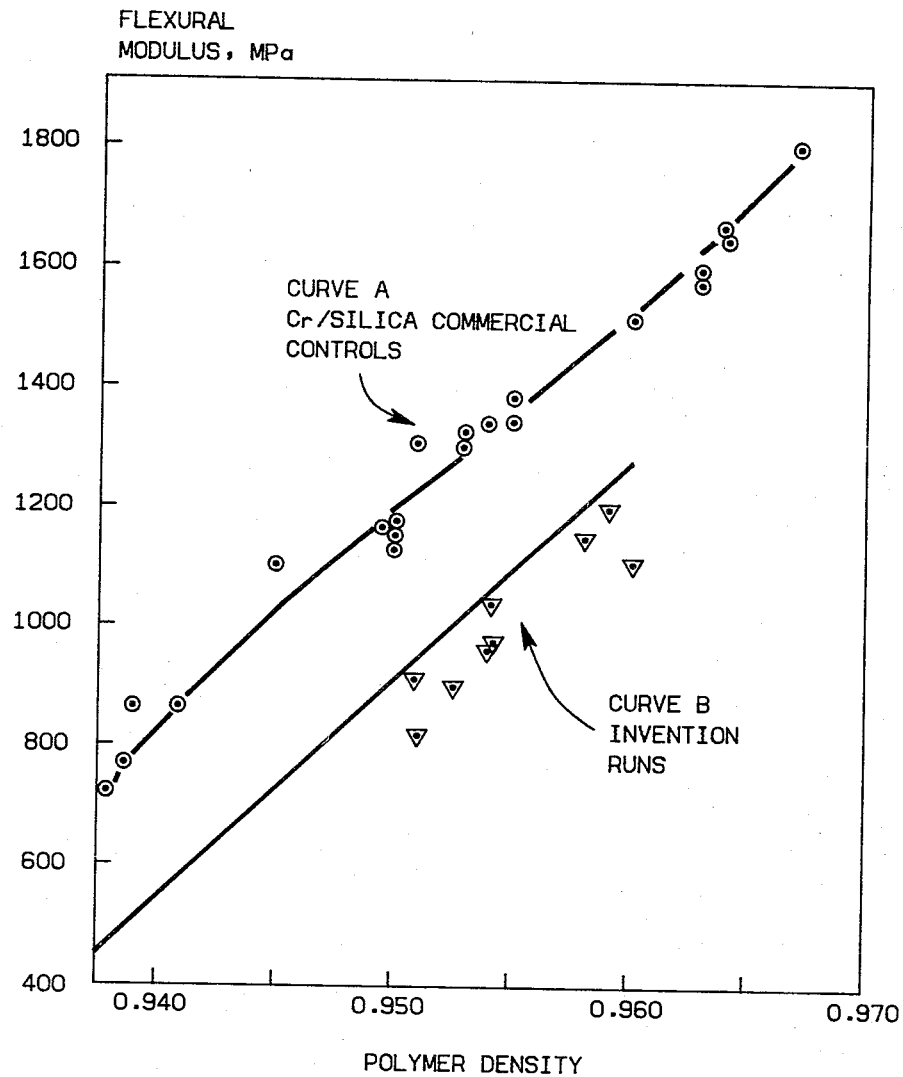

PHOSPHATE CONTAINING SUPPORT WITH ZEROVALENT CHROMIUM

BACKGROUND OF THE INVENTION

This invention relates to a phosphate-containing supported chromium catalysts for olefin polymerization.

Supported chromium catalysts can be used to prepare olefin polymers in a hydrocarbon solution to give a product having excellent characteristics from many standpoints. Silica supported chromium catalysts can also be used to prepare olefin polymers in a slurry system wherein the polymer is produced in the form of small particles of solid material suspended in a diluent. This process, frequently referred to as a particle-form process, has the advantage of being less complex. However certain control operations which are easily carried out in the solution process are considerably more difficult in the particle-form process. For instance, in the solution process, control of the molecular weight can be effected by changing the temperature with lower molecular weight (higher melt flow) being obtained at the higher temperature. However, in the slurry process, this technique is inherently limited since any efforts to increase the melt flow to any appreciable extent by increasing temperature would cause the polymer to go into solution and thus destroy the slurry or particle-form process. It is known to extend the range of melt flow capability of a given catalyst through the use of hydrogen. However, it has not heretofore been commercially feasible to produce a complete spectrum of polymers, so far as melt flow is concerned, in a slurry system with a single chromium catalyst system.

Also it is frequently desired to have a polymer with broader molecular weight distribution than is normally obtained in the slurry or particle-form process. Different applications require polymer having different flexural modulus or stiffness. While it is frequently desired to have a stiffer polymer than is normally produced, there are also many applications where it would be desirable to have a lower flexural modulus.

There would be certain advantages to utilizing zerovalent chromium in supported chromium olefin polymerization catalyst systems in that there are some problems associated with calcining a base already containing chromium. However, while it has long been known to utilize zerovalent chromium on silica supports, such use has never achieved commercial success because of the very low activity associated therewith. While it has long been known to use metal phosphates as supports for chromium olefin polymerization catalysts, such supports have never achieved commercial success. Thus olefin polymerization using the chromium catalyst system is still carried out utilizing hexavalent chromium on a silica-containing base in a manner similar to that used decades ago when the chromium catalyzed polymerization of olefin polymers first became commercial.

SUMMARY OF THE INVENTION

It is an object of this invention to provide a catalyst capable of giving both high melt flow and broad molecular weight distribution;

It is a further object of this invention to provide a catalyst suitable for use in slurry polymerization systems;

It is yet a further object of this invention to provide a catalyst capable of giving polymer suitable for blow molding and other applications requiring good melt strength;

It is yet a further object of this invention to provide a catalyst capable of producing olefin polymers having unexpectedly low flexural modulus;

It is yet a further object of this invention to provide a single catalyst system capable of giving a broad spectrum of polymers so far as melt flow is concerned;

It is a further object of this invention to provide an improved phosphate-containing supported chromium catalyst system for olefin polymerization;

It is yet a further object of this invention to provide a catalyst system having unusual sensitivity to molecular weight control agents such as hydrogen; and It is still yet a further object of this invention to avoid the problems associated with calcining chromium containing supports.

In accordance with one embodiment of this invention, a zerovalent chromium compound and an activated phosphate-containing support is utilized in conjunction with an organometal cocatalyst. In accordance with another embodiment of this invention, the phosphate-containing xerogel is formed by removing water from an aluminum phosphate hydrogel by means of azeotropic distillation or washing with a volatile water miscible organic compound, activated and thereafter zerovalent chromium is incorporated therewith. In accordance with other embodiments of this invention, a phosphate-containing support for zerovalent chromium is formed by forming aluminum orthophosphate from an aluminum alkoxide or from a melt, phosphating silica or alumina, or forming an $AlPO_4$/silica composition.

BRIEF DESCRIPTION OF THE DRAWING

The drawing is a plot of flexural modulus versus density.

DESCRIPTION OF THE PREFERRED EMBODIMENTS

The base or support can be formed in a number of ways. Four methods of preparing the support are set out hereinbelow under the headings Method A, Method B, Method C and Method D.

Method A.

The support of Method A is at least predominantly amorphous aluminum orthophosphate. In accordance with Method A, the phosphate-containing support can be formed using three separate techniques. First, conventional techniques as disclosed in Hill et al, U.S. Pat. No. 4,219,444, the disclosure of which is hereby incorporated by reference can be used. In this technique an aluminum salt is combined with a source of phosphate ions in an aqueous medium and neutralized with a base to give a hydrogel. Alternatively, a polar organic solvent can be used. The second technique for forming the base of Method A is to combine a hydrolyzable organoaluminum compound such as an aluminum alkoxide as disclosed in Pine, U.S. Pat. No. 3,904,550, the disclosure of which is hereby incorporated by reference, with orthophosphoric acid to give a xerogel directly.

In accordance with the third technique of Method A, an aluminum phosphate gel is formed from a concentrated mass of reactants comprising aluminum ions from an aluminum salt and a source of orthophosphate ions. This is done by using an aluminum salt which will melt, preferably one which will melt at or below the boiling point of water or by forming a syrup of a water soluble aluminum salt and a very small amount of water.

Generally, hydrated aluminum salts such as hydrated aluminum nitrate are most susceptible to being melted and thus are preferred as the source of aluminum ions for the melt method. Aluminum bromide and hydrated aluminum bromate can also be used as can, broadly, any aluminum salt which will melt. If desired up to 20 weight percent additional water can be present based on the weight of the aluminum salt or there can be no water except the water, if any, from the water of hydration and the water, if any, from the base used in the subsequent neutralization, i.e., no extraneous water is added. By additional water is meant water actually added as water and does not count the water, if any, from the water of hydration of the ingredients and/or the water from the base, if any. There may be some advantage to adding 1 to 15 weight percent water based on the weight of the aluminum salt, however. The percentage of water are based on the actual weight of the aluminum salt including any water of hydration.

Alternatively, an aluminum salt which will not necessarily melt but which will dissolve enough to form a syrup in 40 weight percent, or less, water based on the weight of the aluminum salt can be used. Generally, 5 to 20 weight percent water is used based on the weight of the aluminum salt when a syrup is formed. Aluminum sulfate, for instance is ideally suited for use in this embodiment of the invention.

The source of the phosphate ions can be any source of orthophosphate ions and is generally orthophosphoric acid or orthophosphates, such as monobasic ammonium phosphate or dibasic ammonium phosphate or mixtures thereof.

The temperature, if a melt is used, can be any temperature at or above which the aluminum salt chosen will melt. The reaction can be carried out in any atmosphere including air or can be carried out under an inert atmosphere for instance. Generally, temperatures of 65°–200° C., preferably 65°–100° C. are used. Although, since the preferred aluminum salt is $Al(NO_3)_3.9H_2O$ which melts at 73° C., the most preferred temperatures based on the use of this aluminum salt is about 80° C.±5° C. If a very concentrated syrup of a water soluble aluminum salt and water are used, any temperature up to the boiling point of the water under the conditions employed can be used, preferably 20°–100° C.

One of the advantages of this technique is that, since very little water, if any, is present during the formation of the aluminum phosphate, it is not necessary to utilize azeotropic distillation or washing with a normally liquid water miscible organic solvent to remove the water gently. The most important advantage, however, is that the concentrated mass gives a gel with greater physical strength.

Low pore volume hydrogels usually give the highest porosity xerogels after drying because they have superior internal strength to withstand the compression of surface tension. Thus, if the hydrogel occupies 6 cc per gram of aluminum phosphate or less, generally 3 to 6 cc per gram, it will give a xerogel having improved porosity for a catalyst base than will a hydrogel conventionally prepared from a dilute aqueous solution which will occupy about 11 cc per gram or more. By 6 cc per gram, for instance is meant that each gram of any aluminum phosphate occupied 6 cc in the hydrogel stage. Thus, another way to define the phosphate of the third technique is that the aluminum salt melt/phosphate mass or aluminum syrup/phosphate mass is sufficiently concentrated so as to give a hydrogel which occupies 3 to 6 cc per gram. The theoretical minimum if no extraneous water is added is about 3 cc per gram with aluminum nitrate.

It is frequently preferred that a small amount of a boron compound such as $B(OH)_3$ be introduced into the melt to be coprecipitated with the aluminum phosphate. Other suitable boron compounds include borates such as ammonium borate. By coprecipitated as it relates to the boron compound, it is meant that the aluminum phosphate is formed into a true hydrogel in the presence of the boron compound. It is not known to what extent the boron compound becomes incorporated into the hydrogel structure. The amount of boron compound present when the aluminum phosphate is gelled can vary widely but it is generally used in an amount so as to give about 1 to 30 mole percent boron based on the moles of phosphorus.

The neutralization in the first and third techniques of Method A can be carried out either by combining the acid phase (aluminum salt/phosphate source mixture) with the neutralizing agent or vice versa. One suitable practice is to drip the acid phase into the neutralizing agent. This results in the production of small spheres or balls of the orthophosphate, particularly with the third technique where the melt of aluminum salt and source of phosphate ions is dripped or sprayed or otherwise slowly added to a large excess of ammonium hydroxide. The spheres are subsequently collected, washed, dried and calcined. It is desirable that the gellation in the first and third methods not occur at a pH of about 4. The pH can be at least 6 during the gel formation. Generally, the pH when the gellation occurs will be 5 to 10, more generally 6 to 10. This is effected by slowly combining with stirring about 72 percent of the neutralizing agent required for complete neutralization and then quickly combining the rest so as to go quickly through the 4–5 pH range. Alternatively, about 60 to 70 percent of the neutralizing agent required for complete neutralization can be combined and the resulting composition allowed to age until gellation occurs. While any base can be used, concentrated ammonium hydroxide, ammonia gas or ammonia dissolved in an alcohol or other non-aqueous solvent are preferred basic materials. Also ammonium carbonate can be used as the neutralizing agent as can ethylene oxide or propylene oxide.

The aluminum and phosphorus components are selected so as to give an atom ratio of phosphorus to aluminum within the range of 0.2:1 to 1:1, preferably 0.6:1 to 0.9:1. While these compositions can be visualized for convenience as a mixture of alumina and aluminum phosphate of varying proportions, they are in fact not a mixture.

Method B.

The support of Method B is a phosphated silica-containing material generally composed of 80 to 100 weight percent silica, the remainder, if any, being selected from alumina, boria, magnesia, thoria, titania, zirconia, or mixtures thereof. For instance, the silica-containing material can consist essentially of silica and no more than 0.2 weight percent of alumina or other metal oxide. Other ingredients which do not adversely affect the catalyst or which are present to produce some unrelated result can also be present. The silica can be a large pore material prepared as described in U.S. Pat. Nos. 3,887,494 which issued June 3, 1975 to Dietz covering the preparation of silica-titania cogels or 3,900,457 which issued Aug. 19, 1975 to Witt covering the preparation of a synthetic silica, the disclosures of which are hereby incorporated by reference. These types of silicas are known in the art to inherently give higher melt flow polymer. However, one of the advantages of the use of the support of Method B is that the silica base which is to be phosphated does not have to be a large pore silica. Thus, in accordance with one of the preferred embodiments of this invention, less expensive silicas made by simple tray drying, oven drying or spray drying can be used. These silicas are easier and less expensive to produce and are inherently more durable.

The treatment to produce the phosphated silica support is preferably carried out simply by forming a slurry of the silica xerogel and a source of phosphate ions, such as orthophosphoric acid by either adding the acid to the support or the support to the acid. Alternatively, an orthophosphate can be utilized. The preferred phosphate is a monoammonium phosphate although diammonium phosphate or metal phosphates or any phosphorus compound convertible to a phosphate can be utilized as the phosphating agent. Any reasonable temperature and atmosphere can be utilized for the incorporation of the phosphorus compound with the silica with room temperature in air being entirely satisfactory. Alternatively, a phosphorus compound such as $POCl_3$ (phosphoryl chloride or $PCl_3$, phosphorus trichloride) can be vaporized and the vapor contacted with the silica. These materials will react with surface OH groups and give off HCl. This vapor treatment can be carried out at the vaporization temperature of the phosphorus compound up to about 400° C.

The term "phosphated" is meant to describe the silica treated with a phosphorus compound as described herein and not necessarily to mean that phosphate groups are attached to the silica.

Alternatively, the phosphating agent can be added to the silica at the hydrogel stage of the silica.

The phosphorus component is added in an amount to give 0.001 to 0.2, preferably 0.01 to 0.1 gram atoms of phosphorus per mole of silica. Most preferably about 1 to 5 mole percent is used which would be about 1 to 5 atoms of phosphorus per atom of chromium particularly when the preferred 1 weight percent chromium based on the weight of the phosphated support is used. Generally, the ratio of atoms of phosphorus per atom of chromium will be in the range of 0.1 to 20, preferably 1 to 10. Based on surface area, the phosphorus compound is preferably present in an amount sufficient to give about 0.005 to 1, preferably about 0.01 to 0.5 mg $P/m^2$ of silica surface as measured by BET nitrogen sorption.

Method C.

The support of Method C is a silica/phosphate combination and is the least preferred of the four types of supports. The silica/phosphate combination of Method C can be made in four separate techniques. First, the two can be coprecipitated as is known in the art, for instance as shown in Kirby, U.S. Pat. No. 3,342,750 (Sept. 19, 1967), the disclosure of which is hereby incorporated by reference. In accordance with this technique, a silicate is combined with a source of aluminum ions and a source of phosphate ions and neutralized to form a hydrogel cogel. The silicate is preferably a tetrahydrocarbylorthosilicate, such as ethyl silicate, although sodium silicate can also be used. The aluminum component is preferably aluminum nitrate although aluminum chloride or other aluminum salts can be used. The source of phosphate ions is preferably orthophosphoric acid although monobasic dihydrogen ammonium phosphate, and dibasic hydrogen ammonium phosphate, for instance, can also be used. This reaction is generally carried out in an aqueous medium although a polar organic solvent can be used. It is frequently preferred that a small amount of a boron compound such as boric acid be introduced into the reaction mixture to be coprecipitated with the aluminum phosphate and silica. Other suitable boron compounds include borates such as ammonium borate. By coprecipitated as it relates to the boron compound, it is meant that the silica/aluminum phosphate is formed into a hydrogel in the presence of the boron compound. It is not known to what extent the boron compound becomes incorporated into the hydrogel structure. The amount of boron compound present when the silica/aluminum orthophosphate cogel is formed can vary widely but it is generally used in an amount so as to give 0.5 to 15 mole percent boron based on the moles of phosphorus.

While any basic material can be used, concentrated ammonium hydroxide, ammonia gas, or ammonia dissolved in alcohol or other nonaqueous solvent are preferred basic materials. Ammonium carbonate alone or in combination can be used as the neutralizing agent, as can ethylene oxide or propylene oxide.

The neutralization can be carried out either by adding the acid phase to the neutralizing agent or vice versa. One suitable practice is to drip or spray or otherwise slowly add the acid phase into the base phase. It is sometimes preferred that the gellation occur at a pH of at least 5, preferably at least 6. Generally the pH when the gellation occurs will be in the range of 5 to 10, preferably 6 to 10.

Since gellation will occur spontaneously at a pH of about 4, which is achieved by combining about 72 percent of the base, or other neutralizing agent, either about 60 to 70 percent of the neutralizing agent is combined slowly and then the composition is allowed to age until gellation occurs, or else about 72 percent of the base is slowly combined with stirring and then the rest is combined quickly so as to go through the 4–5 pH range quickly as described above.

It may be desirable in some instances to coprecipitate other materials such as titania with the silica/aluminum orthophosphate cogel or have other materials present during the gellation.

In accordance with the second technique of Method C, the silica/aluminum orthophosphate cogel is made by impregnating a silica hydrogel or xerogel with aluminum phosphate. This is carried out by combining the source of aluminum ions and orthophosphate ions with a slurry of silica hydrogel or xerogel and then evaporating the solvent whereupon the aluminum orthophosphate forms. To a substantial extent, it is believed the aluminum orthophosphate forms within the pores of the silica. Alternatively, the source of aluminum and phosphate ions can be adsorbed into the dry silica. This is largely a physical impregnation and entrapment of the phosphorus component in the pores of the silica. When a silica xerogel is used, instead of evaporating to dryness, the evaporation can stop when the liquid in excess of one pore volume is gone but some liquid remains in the pores and a gel formed by adding a neutralizing agent, or an amount of liquid less than one pore volume can be added initially and the gel formed by adding a neutralizing agent. The scope of the silica can be the same as in Method B.

As to the scope of the aluminum and phosphorus components, the base when used, and the solvent, is the same as that set out hereinabove with regard to the first technique of Method C. One difference in scope between these two techniques is that in this technique a boron compound such as ammonium borate or boric acid can be substituted for the aluminum salt so as to form what is believed to be boron phosphate onto the silica on evaporating the solvent.

In accordance with the third technique of forming the silica/phosphate base in accordance with Method C, aluminum orthophosphate is precipitated (gelled) in the presence of a silica-alumina hydrogel or xerogel. This results in forming the silica-alumina as a dispersed phase in an aluminum orthophosphate matrix as opposed to having the aluminum orthophosphate impregnated into the pores of the silica. In accordance with this technique, a source of aluminum and phosphate ions is combined with a silica-alumina hydrogel or xerogel and the aluminum orthophosphate formed by combining with a neutralizing agent. The scope of the ingredients is the same as in the first technique of Method C hereinabove except monobasic ammonium phosphate is the preferred source of phosphate ions. As with the first technique of Method C, a boron compound can be present during the precipitation of the aluminum orthophosphate. Also, the same pH considerations as in the first technique of Method C apply.

In accordance with the fourth technique of Method C for making the phosphate composition, a silica-alumina xerogel and an aluminum orthophosphate xerogel are simply physically mixed. The scope of the ingredients for making the separate silica-alumina and aluminum orthophosphate are the same as those used in the first technique of Method C for making the cogel. More broadly, any known method of making silica-alumina suitable for use as a base in olefin polymerization catalysts and any known methods of making aluminum orthophosphate having relatively high surface area can be used for producing the silica and aluminum orthophosphate, respectively. In addition, the aluminum orthophosphate can be made by forming a melt of an easily melted aluminum salt such as hydrated aluminum nitrate, adding a source of phosphate ions and neutralizing as described in Method A, technique three. The resulting silica-alumina and aluminum orthophosphate xerogels can simply be ground together or blended in a conventional dry blender or mixed in a slurry with a nonreactive diluent such as hydrocarbon. In making the phosphate, the same pH considerations apply as in the first technique of Method C.

One way of achieving this mixture is to charge the silica-alumina and aluminum orthophosphate in powder form to the activator with the fluidization normally employed during the activation serving to effect the mixing. Alternatively, the silica-alumina and aluminum orthophosphate can be separately activated, the zerovalent chromium added and thereafter the two combined.

Because the different supports, particularly when employed in conjunction with a boron-containing cocatalyst, have different effects on the structure of the ultimate polymer, adjustment of the ratio of silica-alumina to phosphate in the support can be utilized to effect quality control of the ultimate product.

The aluminum and phosphorus components in Method C are selected so as to give an atom ratio of phosphorus to aluminum within the range of 0.2:1 to 1:1, preferably 0.6:1 to 0.9:1. Further with respect to the relative proportions, in all techniques except technique two, the silica and phosphate will generally be used in molar ratios of 10:1 to 1:20 moles of silica per mole of phosphate (or gram atoms of phosphorus), preferably 2:1 to 1:2 moles per mole or gram atom. In embodiment two, the phosphate will generally be used in an amount within the range of 1 to 50, preferably 5 to 25 mole percent based on the moles of silica.

Method D.

In accordance with Method D for preparing the phosphate-containing base, alumina is phosphated in a manner analogous to the phosphating of silica in Method B. As with the silica, the alumina can be phosphated either by combining the phosphating agent with the hydrogel or combining the phosphating agent with the xerogel. The same scope of phosphating agents applicable to phosphating the silica are applicable to phosphating the alumina. In addition to phosphating pure alumina, it is also within the scope of this method of producing the phosphate-containing base to utilize an aluminum phosphate described in Method A having a low (less than about 0.6, generally less than 0.4) phosphorus to aluminum ratio and treating it with the phosphating agent to impart additional phosphate to the surface. The alumina can contain minor amounts of other ingredients which do not affect the quality of the final catalyst, but is generally essentially pure alumina or low phosphorus aluminum phosphate.

If an alumina hydrogel is phosphated, the phosphoric acid is preferably incorporated in the organic water miscible liquid used to wash the hydrogel. More specifically, the hydrogel may be washed with water, then with an organic liquid such as isoamyl alcohol containing phosphoric acid, then filtered and the solvent allowed to evaporate.

Whether the starting material is pure alumina or a low phosphorus aluminum orthophosphate, Method D takes advantage of the fact that some properties, such as surface area, are favored by high aluminum content whereas others, such as melt index potential, are favored by high phosphate content. By imparting a phosphate layer on the surface of pure alumina or low phosphorus aluminum phosphate, both trends can be taken advantage of.

The phosphating agent is preferably used in an amount to react with the alumina surface and give a P/Al ratio of this reaction product on the surface of 0.2:1 to 1:1, preferably 0.6:1 to 0.9:1. In practice, however, it is possible to use as much phosphating agent as desired with the excess simply being washed off after the phosphating treatment is complete. The phosphating treatment is generally carried out at a temperature 15° C. to 500° C., preferably room temperature to the boiling point of the solvent if a phosphate solution is used or 500° C. if a vapor is used and a time of 1 minute to 2 hours, preferably 2 minutes to 30 minutes.

In any of the four methods set out hereinabove, wherein a hydrogel is formed, it is greatly preferred that the water be removed to convert the hydrogel to a xerogel by means of azeotropic distillation or washing with a water miscible liquid. Any such water miscible liquid effective in aiding in removing water can be utilized. Generally, such liquids are relatively volatile, oxygen-containing organic compounds having relatively low surface tension. Exemplary classes of such compounds are alcohols, ketones, and esters. Particularly suitable are alcohols, such as isoamyl alcohol and esters, such as ethyl acetate.

As to Method A, it is readily apparent that the hydrogel resulting from technique 1 utilizing an aqueous solution of the aluminum component, the phosphorus component, and an aqueous solution of the base results in free water in the hydrogel. In technique 2 of Method A, there could be some water from the water in the phosphoric acid although there is no water from a base since a base is not required and hence this is essentially an anhydrous preparation. In technique 3 of Method A, there is essentially no free water in the resulting gel from the acid phase ingredients so that the resulting gel inherently has the good characteristics associated with the hydrogels made in non-aqueous systems. However, there may be some water carried over from water of hydration of the aluminum component and/or from the base and also it may be desirable in some instances in technique 3 of Method A to wash the resulting gel with water in which case azeotropic distillation to remove the water is desirable.

In Method C, techniques 1 and 3, carried out utilizing aqueous solutions of the ingredients involve the formation of hydrogel having excess free water and thus create the situations where azeotropic distillation or washing with a water miscible solvent is highly desirable.

Regardless of which of the four methods (A, B, C, or D) described hereinabove are used, the resulting support is calcined or activated and thereafter the zerovalent chromium is added in an anhydrous fashion. Thus briefly, the technique for forming the catalyst involves forming a phosphate-containing support, activating the support by heating in a reducing, inert or oxidizing ambient, and adding zerovalent chromium anhydrously to form a catalyst. In some instances, the catalyst is used with a cocatalyst, such as an organoboron compound. Other ingredients which do not adversely affect the catalyst can be used with the final catalyst such as other cocatalysts or antistatic agents in the polymerization zone, for instance.

The term "xerogel" is used to refer to the gel resulting from the removal of free water from the hydrogel.

The activation of the xerogel can be carried out at temperatures known in the art although the phosphate-containing base of this invention can be activated at slightly lower temperatures, for instance temperatures of 150°–800° C., preferably 400°–600° C., compared with the 450°–1000° C. temperature generally employed for silica bases. With technique 4 of Method C, if the silica-alumina and aluminum phosphate are to be combined after activation, each can be activated at the temperature optimum for that component, i.e., 450°–1000° C. for the silica-alumina and 150°–800° C. for the phosphate. Thus broadly temperatures of 150°–1000° C. can be used. Suitable activation times are from 1 minute to 48 hours, preferably 0.5 to 10 hours.

When the activating ambient is an oxidizing ambient, it can be any oxidizing ambient but for convenience and economy, an oxygen-containing ambient such as air is preferred. Preferred reducing ambients are pure CO and CO/N₂ mixtures. Preferred inert ambients are N₂ and vacuum.

The zerovalent chromium compound can be any zerovalent chromium compound known in the art. These compounds are frequently referred to as π-bonded organochromium compounds. Preferred π-bonded organochromium compounds are the diarene chromium compounds having the following structure:

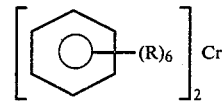

wherein R is selected from the group consisting of hydrogen and alkyl radicals having from 1 to 6 carbon atoms. Examples of these compounds include dibenzene chromium, ditoluene chromium, di-o-xylene chromium, di-p-xylene chromium, dicumene chromium, dimesitylene chromium, di(n-propylbenzene) chromium, di(1,3,5-triethylbenzene) chromium, di(1,3-diethyl-4-hexylbenzene) chromium, di(1,3-dipentylbenzene) chromium, di(1,3,5-trihexylbenzene) chromium, di(hexamethylbenzene) chromium and the like. It is believed that the chromium in these diarene compounds has a valence of 0, the two organo groups being the same or different ligands. Other zerovalent chromium compounds such as toluene chromium tricarbonyl are operable but are not nearly as good as the materials of the above formula.

The organochromium compounds are liquids or solids soluble in many organic solvents. Preferred solvents are non-polar liquids at ambient temperatures which are sufficiently volatile to allow removal by evaporation. Types of suitable solvents include alkanes, cycloalkanes, aromatic hydrocarbons, halogenated compounds, ethers and the like. Exemplary solvents include pentane, n-hexane, decane, cyclohexane, methylcyclohexane, benzene, xylenes, chloroform, diethyl ether, etc., and mixtures of one or more of the pure compounds. While the liquid compounds can be introduced into the support neat, it is preferred in all cases to use a solvent. Preferably a sufficient quantity of a solution of the chromium compound is used to completely wet the support and fill the porous structure to insure even distribution of the metal compound on the support. Generally, the solutions contain from about 0.002 to about 25 weight percent of the organochromium compound.

A sufficient volume of the solution of the organochromium compound is taken so as to provide from 0.001 to 10, preferably 0.1 to 5, more preferably about 1 weight percent chromium based on the weight of the activated support. The contact between the support and organochromium solution is effected in a conventional way such as by slurrying and at any convenient temperature. Generally, ambient temperature is used, although temperatures ranging from about the freezing point of the solvent to as high as about 300° F. can be employed during the contacting period. Contact times from a few seconds to several hours are adequate.

Alternatively, the zerovalent chromium compound and the aluminum phosphate can be added separately to the reactor.

The incorporation of the zerovalent chromium compound onto the activated base is preferably carried out in an inert atmosphere, such as nitrogen or under a vacuum, and the resulting catalyst is maintained in an inert atmosphere or under vacuum until it is used.

The cocatalyst, when used, is an organometal compound, preferably a trihydrocarbylborane, more preferably trialkylborane, the alkyl groups preferably having 1 to 12, more preferably 2 to 5, carbon atoms per group. Triethylborane, tri-n-propylborane, and tri-n-butylborane are especially preferred. Tri-n-butylborane is most preferred because it is believed to give greater MI increase (melt index increase in the resultant polyolefin) than the others tested. Other boron compounds such as boron alkoxides, for instance $B(C_2H_5)_2OC_2H_5$, alkyl haloboron compounds, for instance $BC_2H_5Cl_2$, aryl borons such as triphenylborane and metal aryl borate $(MBR'_4)$ can also be used. Conventional organoaluminum cocatalysts, such as triethylaluminum, are sometimes desirable either alone or in combination with the organoboron compound.

The cocatalyst when used is utilized in an amount so as to give an atom ratio of metal such as boron to chromium within the range of 0.5:1 to 10:1, preferably 2:1 to 5:1. Based on the solvent if any in the polymerization zone, the amount of metal compound cocatalyst is generally within the range of 0.5 to 20, preferably 2 to 10 parts by weight per million parts by weight of the solvent, these amounts being based on the total reactor contents in instances where no solvent is utilized. The cocatalyst can either be premixed with the catalyst or added as a separate stream to the polymerization zone, the latter being preferred.

The base of this invention can be further treated in the same manner as chromium on conventional silica catalysts are sometimes given special treatments, such as being fluorided or being reduced and reoxidized as disclosed in McDaniel et al, U.S. Pat. No. 4,151,122 (Apr. 24, 1979), the disclosure of which is hereby incorporated by reference.

The catalysts produced using the base prepared by the novel method of this ivention containing a zerovalent chromium compound thereon can be used to polymerize at least one mono-1-olefin containing 2 to 8 carbon atoms per molecule. Such catalysts are of particular applicability in producing ethylene homopolymers and copolymers of ethylene and one or more comonomers selected from 1-olefins containing 3 to 8 carbon atoms per molecule such as propylene, 1-butene, 1-pentene, 1-hexene and 1-octene. These polymers can be produced by solution polymerization, slurry polymerization, and gas phase polymerization using conventional equipment and contacting processes. Contacting of the monomer or monomers with the catalyst can be effected by any manner known in the art of solid catalyst. One convenient method is to suspend the catalyst in an organic medium and to agitate the mixture to maintain the catalyst in suspension throughout the polymerization process.

The catalyst of this invention is particularly suitable for use in slurry polymerization systems to produce a complete spectrum of polymers so far as melt flow is concerned, utilizing a single catalyst. Everything from blow molding grade resins which may require a melt index of as little as 0.1 or less to paper coating and injection molding grade resins which may require a melt flow of 20 or greater can be produced from a single catalyst system simply by the use of a molecular weight control agent, such as hydrogen. While hydrogen is known as a molecular weight control agent, the phosphate-containing supported catalyst of this invention displays an extraordinary sensitivity to hydrogen so that by controlling the amount of hydrogen utilized, polymers having a very high molecular weight as indicated by low melt flow, through polymers having a very low molecular weight as indicated by high melt flow can be obtained. Further control of melt flow can be obtained by the small amount of leeway in temperature control and by the known effect of higher catalyst activation temperature causing the melt flow of the resulting polymer to be higher. However, yet a further advantage of this invention is that a single activation temperature for the catalyst and a single polymerization temperature can be utilized and still obtain a broad spectrum of polymers utilizing a single catalyst.

With slurry polymerization of ethylene and predominantly ethylene copolymer systems, the feasible temperature range is generally about 200°–230° F. (93°–110° C.) and the commercial systems are generally run as close to the maximum as possible, i.e., 225°±5° F. (107° C.±3° C.) in order to get the highest possible melt index. The catalyst of this invention allows running at the low end of the possible temperature range, i.e., 205° F.±5° F. (96° C.±3° C.) in systems normally employing 225° F. (107° C.). The lower temperature gives a relatively higher monomer partial pressure, thus giving higher activity.

Catalysts of this invention have the further advantage of not having any measurable induction time between initial contact with the monomer and the initiation of polymerization.

When hydrogen is used in the prior art, it is generally used at partial pressures up to 120 psia (0.8 MPa), preferably within the range of 20 to 70 psia (0.14 to 0.48 MPa). These same amounts of hydrogen can also be used in this invention, although because of the high sensitivity to hydrogen, it may be preferred in the present invention to use 5 to 20 psia.

The tendency of the catalysts of this invention to produce higher melt flow polymers when hydrogen is utilized corresponds to the tendency of other catalyst systems to produce higher melt flow polymers when hydrogen is utilized, the difference being that the catalyst of this invention is extraordinarily sensitive to the effects of hydrogen. In other areas, the catalyst of this invention acts in a manner different from the prior art catalysts. For instance, boron cocatalysts sometimes are used in the prior art in spite of the fact that they tend to have an adverse effect on melt flow, i.e., cause the melt flow to drop. However, the boron cocatalysts of this invention slightly increase the melt flow capability of the catalyst.

If the object is to produce a copolymer, 0.5 to 20 mole percent comonomer or more can be used, although enough to give 0.4 to 3 weight percent incorporation is preferred. As used herein, the term "at least predominantly ethylene" means an essentially pure ethylene monomer feed as a feed containing ethylene as the principal monomer with 0.5 to 20 mole percent comonomer.

Another area in which the prior art olefin polymers always represent a compromise in properties is with regard to shear response. For certain applications, a high shear response as evidenced by the ratio of high load melt index to melt index (HLMI/MI), is desirable. This has heretofore been associated with broad molecular weight distribution as determined by size exclusion chromatography, for instance. Unexpectedly, the polymers produced by the catalysts of this invention exhibit a high shear response as evidenced by high HLMI/MI ratios indicating relatively broad molecular weight distribution. Size exclusion chromatography analyses indicate an extraordinarily broad molecular weight distribution which is particularly surprising since the same supports with hexavalent chromium give polymers having a far narrower $M_w/M_n$ than would be expected for a given HLMI/MI ratio. In this regard, it must be kept in mind that HLMI/MI ratios are meaningful only if compared on a comparable melt index basis. The references herein to melt index (MI) refer to ASTM D1238-65T, Condition E, and to high load melt index (HLMI) refer to ASTM D1238-65T, Condition F, the difference being 21,600 gram weight in the high load test and 2,160 gram weight in the regular melt index test, the temperature being 190° C. in each instance when the tests are utilized for predominantly ethylene polymers and copolymers.

Another area where the polymers produced by the catalysts of this invention exhibit an unexpected property is in the modulus produced for a given comonomer content. For instance with ethylene homopolymer, the catalyst of this invention gives a polymer having lower flexural modulus than would have been expected based on what is normally obtained using hexavalent chromium on silica. This is particularly surprising since the phosphate supports using hexavalent chromium give higher modulus than is obtained from hexavalent chromium on silica supports. While there are many applications where higher modulus is desired, there are also many applications where lower modulus is desired. Thus, the catalyst of this invention made possible the unique ability to produce a high density, low flexural modulus polymer which is a particular applicability in uses where flexibility is desired, such as squeeze bottles and flexible wrappings.

Whether determined by size exclusion chromatography (SEC) or the newer RDI (Rheometric Dynamic Spectrophotometer index) test, the breadth of molecular weight distribution, as expressed by $M_w/M_n$ wherein $M_w$ is the weight average molecular weight and $M_n$ is the number average molecular weight, is greater by an order of magnitude or more from that normally found even in what would be considered broad molecular weight distribution polymers of the prior art.

While, as noted hereinabove, zerovalent chromium has been shown in the art for use as polymerization catalysts supported on silica, in fact such use generally involves specialized techniques since in general zerovalent chromium on silica shows little or no activity.

Another instance in which the catalysts of this invention give an effect which is opposite to that obtained with the catalysts of the prior art is in the ratio of methyl to vinyl groups in the resulting polymer wherein the ratio increases whenever hydrogen is used which is a sign that hydrogenation may be occurring. This is unlike the effect found in polymers either made by conventional chromium oxide on silica catalysts or chromium oxide on phosphate base. The activity for zerovalent chromium on phosphate based catalysts which have been converted from the hydrogel to the xerogel by means of azeotropic distillation or washing with a water miscible organic liquid is much greater than the activity of hexavalent chromium on similar aluminum phosphate bases in the absence of a boron cocatalyst. Thus, these catalysts can be used without a cocatalyst. The densities and resulting flexural moduli are lower than normal whereas with hexavalent chromium on an aluminum phosphate support, the densities and flexural moduli are higher than normal. Furthermore, while both modulus and densities are lower than normal, the flexural modulus is disproportionately low compared with the density.

The sensitivity of hexavalent chromium systems on aluminum phosphate to hydrogen is greater than the sensitivity of hexavalent chromium on silica so far as producing higher melt index is concerned. However, the sensitivity of zerovalent chromium catalysts of this invention on the phosphate containing base is even greater than that of hexavalent chromium on aluminum phosphate support. Furthermore, the sensitivity is rather dependent on phosphorus aluminum ratio with a greater sensitivity at the lower ratios.

EXAMPLE I

A series of catalyst bases were prepared from an alumina-aluminum orthophosphate composite by forming about 100 mL of a melt containing sufficient Al(NO$_3$)$_3$.9H$_2$O and NH$_4$H$_2$PO$_4$ at about 100° F. (38° C.) to provide a calculated atomic ratio of P:Al of 0.8. Concentrated ammonium hydroxide was added to the melt to form a gel at about pH 7. The product was washed with isopropyl alcohol to remove free water and the product after drying was divided into 3 portions. One portion was calcined in air for 3 hours at 300° C. to form the base for catalyst A1. The second portion was calcined in air for 3 hours at 500° C. to form the base for catalyst A2 and the third portion was calcined in air for 3 hours at 700° C. to form the base for catalyst A3.

The base for catalyst B also had a calculated P:Al atomic ratio of 0.8 and was prepared from a melt as above. However, the product after washing with isopropyl alcohol and drying was calcined for 3 hours in a CO atmosphere at 850° C.

The bases for catalysts C1, C2 and C3 were prepared from a melt as before except that the amounts of hydrated aluminum nitrate and ammonium dihydrogen phosphate were adjusted to provide a calculated P:Al atomic ratio of 0.2. The washed and dried product was divided into three portions. One portion was calcined in air for 3 hours at 300° C. to form the base for catalyst C1, the second portion was calcined in air for 3 hours at 500° C. to form the base for catalyst C2 and the third portion was calcined in air for 3 hours at 700° C. to form the base for catalyst C3.

Individual samples of each catalyst base were impregnated with a 0.5 volume percent (about 7 weight percent) solution of dicumene chromium dissolved in n-heptane sufficient to provide 1 weight percent chromium based on the dry composites. Each mixture was dried in a current of dry nitrogen at about 35° C. to remove about 75 weight percent of the solvent to form the catalyst in the form of an apparently dry product. Each product was stored in dry nitrogen until ready for ethylene polymerization tests or for additional processing, e.g., oxidation at an elevated temperature in air by calcination for 3 hours, prior to being tested in ethylene polymerization.

Ethylene polymerization was conducted with a portion of each catalyst in individual runs under particle form conditions in a 1 L stirred, stainless steel reactor containing about 1.25 lbs. (567 g) of isobutane at a nominal reactor pressure of about 565 psia (3.89 MPa), the specified temperature and a run time of 60 minutes unless otherwise indicated. When shown, the polymerization was conducted in the presence of 4 ppm triethylborane (TEB) based on the diluent weight or 65 psia (0.45 MPa) hydrogen as reactor adjuvants (additives). Each run was terminated by venting the volatile components. The polymer was recovered, dried, weighed and stabilized with a conventional antioxidant system prior to determining its physical properties. The results are given in Tables I, II and III. In the tables, the following nomenclature is used.

Productivity, g/g: grams polymer per gram catalyst.
MI: melt index, g/10 minutes, ASTM D 1238-65T, Condition E.
HLMI: high load melt index, g/10 minutes, ASTM D 1238-65T, Condition F.
Density, g/cc: ASTM D 1505-68.
Flex. Mod., flexural modulus, MPa: ASTM D 790-66.

TABLE IA
Selected Polymer properties Of Similar Density Resins Made With Chromium Oxide-Silica Catalysts

| Density | Flex. Mod. | MI | ESCR |
|---|---|---|---|
| 0.951 | 1310 | 0.35 | 75 |
| 0.955 | 1380 | 0.35 | 45 |
| 0.964 | 1660 | 0.75 | 15–20 |

TABLE II
Ethylene Polymerization At 102° C. Or 96° C., P/Al Atom Ratio Of 0.8

| Run No. | Catalyst No. | Base Calcining Temp. °C. | Reactor Additive | Reactor Temp. °C. | Productivity g/g | MI (HLMI) | HLMI/MI Ratio | Density | Flex. Mod. | ESCR | Vinyl | Methyl |
|---|---|---|---|---|---|---|---|---|---|---|---|---|
| 13 | B | 850 | None | 102 | 3645 | 6.5 (HLMI) | — | 0.9464 | — | — | 0.6 | 1.0 |
| 14 | B | 850 | 65 psia H$_2$ | 102 | 930 | 350+ | 47 | 0.9425 | — | — | 5.9 | 11 |
| 15 | B | 850 | 4 ppm TEB | 102 | 2865 | 0.03 | 1890 | 0.9543 | 1040 | >1000 | 4.4 | 5.2 |
| 16 | B | 850 | None | 96 | 3340 | 0.24 (HLMI) | — | 0.9489 | — | — | 4.5 | 5.4 |
| 17 | B | 850 | 65 psia H$_2$ | 96 | 2410 | 350+ | — | 0.9532 | — | — | 4.6 | 8.4 |
| 18 | B | 850 | 4 ppm TEB | 96 | 3555 | 2.3 | 170 | 0.9591 | 1200 | 0 | 3.4 | 3.7 |

TABLE III
Ethylene Polymerization At 96° C., P/al Atom Ratio Of 0.2

| Run No. | Catalyst No. | Base Calcining Temp., °C. | Reactor Additive | Productivity g/g | MI (HLMI) | HLMI/MI Ratio | Density | Flex. Mod. | ESCR | Vinyl | Methyl |
|---|---|---|---|---|---|---|---|---|---|---|---|
| 19 | C1 | 300 | None | 0 | — | — | — | — | — | — | — |
| 20 | C2 | 500 | None | 3220 | 0 | — | 0.9554 | — | — | 2.4 | 4.8 |
| 21 | C2 | 500 | 65 psia H$_2$ | 2175 | 0.34 | 210 | 0.9582 | 1150 | >1000 | 3.4 | 4.7 |
| 22 | C2 | 500 | 4 ppm TEB | 4020 | 0 | — | 0.9592 | — | — | 2.5 | 2.4 |
| 23 | C3 | 700 | None | 4125 | 0.04 (HLMI) | — | 0.9509 | — | — | 5.6 | 8.6 |
| 24 | C3 | 700 | 65 psia H$_2$ | 2500 | 25.1 | 95 | — | — | — | — | — |
| 25 | C3 | 700 | 4 ppm TEB | 4160 | 0.14 (HLMI) | — | 0.9527 | — | — | 3.3 | 3.5 |

ESCR: environmental stress crack resistance, hours, ASTM D 1693-70, Condition A (50° C.).
HI: heterogeneity index, M$_w$/M$_n$ as determined by means of a Rheometric Dynamic Spectrophotometer.
Vinyl/Methyl: number of vinyl groups and methyl groups per 1,000 carbon atoms of the polymer as determined by infrared analyses.

Examination of the data presented in Tables I, II, III and IA reveals that the flexural modulus values of the polymers are lower than expected based on polymer densities obtained with silica-supported chromium oxide catalysts.

For polymers prepared with invention catalysts as the results in Tables I, II, and III show the following conclusions can be drawn.

(1) The catalysts prepared using zerovalent chromium exhibit sensitivity to the presence of hydrogen which is an order of magnitude greater than that achieved with hexavalent chromium as the high melt

TABLE I
Ethylene Polymerization At 96° C., P/Al Atom Ratio Of 0.8

| Run No. | Catalyst No. | Reactor Additive | Productivity g/g | MI (HLMI) | HLMI/MI Ratio | Density | Flex. Mod. | ESCR | Vinyl | Methyl | RDI | Mw/Mn |
|---|---|---|---|---|---|---|---|---|---|---|---|---|
| 1 | A1$^{(1)}$ | None | 3700 | 15 (HLMI) | — | 0.9511 | 911 | >1000 | 4.7 | 5.5 | 5.0 | 39.0 |
| 2 | A1$^{(1)}$ | 65 psia H$_2$ | 2370 | 17 | 61 | 0.9524 | 908 | — | 5.7 | 7.8 | 2.3 | 30.0 |
| 3 | A1$^{(1)}$ | 4 ppm TEB | 3530 | 0.04 | 790 | 0.9597 | 1140 | 0 | 4.1 | 4.3 | 4.9 | 33.4 |
| 4 | A1$^{(a)(1)}$ | None | 1625 | 0.47 (HLMI) | — | 0.9610 | — | — | — | — | — | — |
| 5 | A1$^{(a)(1)}$ | 65 psia H$_2$ | 1760 | 0.08 | 190 | 0.9610 | — | — | — | — | — | — |
| 6 | A2$^{(2)}$ | None | 4850 | 15 (HLMI) | — | 0.9478 | — | — | 5.2 | 6.0 | 6.1 | 127.5 |
| 7 | A2$^{(2)}$ | 65 psia H$_2$ | 3500 | 160 | — | 0.9484 | — | — | 7.8 | 9.0 | 2.2 | 19.8 |
| 8 | A2$^{(2)}$ | 4 ppm TEB | 5230 | 0.14 | 550 | 0.9538 | 963 | >1000 | 4.8 | 6.1 | 8.7 | 93.5 |
| 9 | A3$^{(3)}$ | None | 3090 | 31 (HLMI) | — | 0.9544 | 966 | >1000 | 5.1 | 4.9 | — | — |
| 10 | A3$^{(3)}$ | 65 psia H$_2$ | 2860 | 345+ | — | 0.9536 | — | — | 6.7 | 8.7 | — | — |
| 11 | A3$^{(3)}$ | 4 ppm TEB | 7030 | 0 | about 60 | 0.9512 | 816 | 0 | 6.0 | 6.0 | — | — |
| 12 | A3$^{(b)(3)}$ | 65 psia H$_2$ | 1565 | 0.23 | 130 | 0.9621 | — | — | — | — | — | — |

$^{(a)}$Catalyst A1 calcined in air at 500° C. prior to polymerization test, i.e., not invention runs.
$^{(b)}$Catalyst A3 calcined in air at 300° C. prior to polymerization test, i.e., not invention runs.
$^{(c)}$Dash signifies not determined or not applicable.
$^{(1)}$300° C. Base calcining temperature.
$^{(2)}$500° C. Base calcining temperature.
$^{(3)}$700° C. Base calcining temperature.

index values show. Thus, of course, oxidation of the catalyst must be avoided.

65 psia (0.45 MPa) hydrogen as a reactor additive. The results are presented in Table IV.

TABLE IV

| Run No. | Hydrogen 65 psia | Productivity g/g | HLMI MI | MI Ratio | Density g/cc | ESCR hrs. | Flex. Mod. MPa | HI | Number Vinyl/Methyl |
|---|---|---|---|---|---|---|---|---|---|
| | | | | | Polymer Properties | | | | |
| 1 | No | 2280 | 0.07 | 337 | 0.9674 | 67 | 1430 | 28 | 2.2/2.7 |
| 2 | Yes | 2400 | 8.8 | 61 | 0.9579 | 0 | 1075 | 18 | 2.9/5.0 |

(2) A base calcination temperature of about 500° C. generally results in more active catalysts than lower or higher calcination temperatures.

(3) When the cocatalyst TEB is employed with the catalyst, the productivity can fluctuate up or down some but generally is about the same order of magnitude as the control in the absence of an additive but in any event, the melt index is increased.

(4) When hydrogen is employed, the methyl to vinyl ratio sometimes increases indicating that hydrogenations may be occurring unlike polymers prepared in the presence of hydrogen with catalysts comprising chromium oxide supported on a silica or aluminum phosphate base.

(5) The $M_w/M_n$ (HI) and RDI values are exceptionally higher than for polymers prepared with other catalysts which are generally in the range of less than 20 and 1 to 2, respectively. Also the SEC curves look bimodal for polymers made in accordance with the invention.

EXAMPLE II

A 50 mL sample of Davison grade 952 silica was dried in fluidizing argon for 1 hour at 200° C. and then treated over a 1 hour period with $POCl_3$ by evaporating 11 mL of the $POCl_3$ into the argon stream. The resulting product was then calcined in fluidizing air at 400° C. for 2 hours. The recovered sample was titrated with base and found to contain 1.1 millimoles of acid per gram to the Bromo Cresol Green end point. Titration of the product with $AgNO_3$ showed that it contained 0.415 millimoles chloride per gram. This was accomplished by adding a sample of the silica to water to hydrolyze the phosphorus chloride compound now associated with the silica. The sample was then heated to 200° C. in air under fluidizing conditions and additionally treated with 2 mL of water evaporated into the air. The cooled, recovered sample was found to contain no chloride by $AgNO_3$ titration. It was again base titrated and found to now contain 0.637 millimoles acid per gram which the phosphorus oxide-silica compound would account for. The sample was then dried by reheating to 500° C. in argon for 1 hour. A portion checked for acid content showed 0.588 millimoles per gram. Thus most of the phosphorus was chemically attached to the silica as an oxide since any free $P_2O_5$ would be removed as a sublimate at the heating temperature. A portion of the recovered treated silica was slurried in n-pentane and mixed with a 0.5 volume percent solution of dicumene chromium in n-heptane sufficient to provide 1 weight percent chromium based on the dry composite. The mixture was dried under a stream of dry nitrogen at about 35° C. to remove about 75 percent of the solvents to yield an apparently dry powdery material as the catalyst. It was stored in a dry nitrogen atmosphere, and was used as a catalyst at 205° F. as before with 8 ppm triethylborane based on the isobutane diluent as cocatalyst (adjuvant) and in the absence or in the presence of The results indicate that fairly active catalysts result based on the productivity results. Hydrogen does not appear to deleteriously affect productivity. The catalyst is sensitive to the presence of hydrogen as the large increase in polymer melt index shows. As in Example I, it is noted that some hydrogenation seems to be occurring based on the increased methyl/vinyl ratio. Also, rather low flexural modulus values are observed compared to polymers prepared with supported chromium oxide catalysts.

The Figure, which forms a part of this application, shows the relationship between density and flexural modulus for polymers produced from the catalyst system of this invention and from conventional chromium on silica catalysts. As can be seen, novel olefin polymers, definable in terms of having a relationship of flexural modulus to density on or below curve B of the Figure are provided in accordance with this invention.

EXAMPLE III

Alumina, 8.0 g (0.079 mole), prepared by flame hydrolysis (sold under the tradename DeGussa) was slurried in 200 mL of isopropyl alcohol and mixed with 6 mL of 85 weight percent $H_3PO_4$ (8.6 g, 0.088 mole). The slurry product was washed with about 2 L of isopropyl alcohol, filtered and air dried. The dry powder was then calcined for 3 hours at 500° C. in air, recovered and stored in dry air. A portion of the calcined product was then impregnated with a 0.5 volume percent (about 7 weight percent) solution of dicumene chromium dissolved in n-heptane sufficient to provide 1 weight percent chromium based on the dry composite. The mixture was then dried at about 35° C. under a current of dry nitrogen to remove about 75 weight percent of the solvent leaving the product (invention catalyst) in the form of an apparently dry powdery material. The catalyst was stored in dry nitrogen pending further use.

Ethylene polymerization was conducted under particle form conditions with a sample of the catalyst in a 1 L stirred stainless steel reactor containing isobutane as diluent and 4 ppm triethylborane (TEB) based on the weight of the diluent at a nominal reactor pressure of 565 psia (3.89 MPa) and temperature of 205° F. (96° C.) for 30 minutes. The volatile components were vented and the polymer recovered, dried, weighed and stabilized as in Example I. It was determined that 560 g polyethylene per g catalyst was made in 30 minutes. The polymer had a HLMI of 4.3.

EXAMPLE IV

A control catalyst was prepared by impregnating a portion of a stock sample of silica (Davison grade 952), previously calcined in air for 3 hours in a fluidized bed at 500° C., with sufficient of the dicumene chromium solution as described before to provide 1 weight percent chromium based on the dry composite. The mixture was dried and stored as before to obtain an apparently dry product as the control catalyst.

Ethylene polymerization was conducted as before for 1 hour with portions of each catalyst at several temperatures at a nominal reactor pressure of 565 psia and in the absence or presence of a reactor additive (adjuvant) as specified. The temperatures and additives employed and the results obtained are given in Table V. In the table, the same nomenclature as in Example I is used.

TABLE V

| Run No. | Adjuvant | Reactor Temp., °C. | Productivity g/g | Polymer Properties | | | | |
|---|---|---|---|---|---|---|---|---|
| | | | | HLMI | Density g/cc | Flex. Mod. MPa | ESCR hrs. | Vinyl/Methyl |
| 1 | None | 96 | 0 | — | — | — | — | — |
| 2 | None | 102 | 0 | — | — | — | — | — |
| 3 | 4 ppm TEB | 102 | 0 | — | — | — | — | — |

The results demonstrate that while fairly active catalysts can be prepared from zerovalent chromium compounds associated with an aluminum phosphate and phosphated silica, a conventional silica support gave dead catalysts.

A control run using zerovalent chromium on silica-alumina (2 weight percent aluminum) gave 1700 g/g/hr productivity, but hydrogen gave only marginal improvement in melt index (up to 4.2 HLMI from 0.4 HLMI). Similarly, a boron cocatalyst gave only marginal melt index improvement with the silica-alumina base.

While this invention has been described in detail for the purpose of illustration, it is not to be construed as limited thereby but is intended to cover all changes and modifications within the spirit and scope thereof.

We claim:

1. A catalyst system comprising:
   (a) a catalyst comprising a zerovalent chromium compound on a phosphate-containing support; and
   (b) cocatalyst selected from organoboron and organoaluminum compounds.

2. A catalyst system according to claim 1 wherein said cocatalyst is a trialkylborane.

3. A catalyst system according to claim 2 wherein said trialkylborane is one of triethylborane, tri-n-propylborane, and tri-n-butylborane.

4. A catalyst system according to claim 3 wherein said trialkylborane is tri-n-butylborane.

5. A catalyst system according to claim 2 wherein said cocatalyst is present in an amount sufficient to give an atom ratio of boron to chromium within the range of 2:1 to 5:1.

6. A catalyst system according to claim 2 wherein the chromium of said chromium compound is present in an amount within the range of 0.1 to 5 weight percent based on the weight of said phosphate-containing support.

7. A catalyst according to claim 6 wherein said zerovalent chromium compound is a π-bonded organochromium compound having the formula

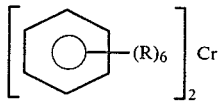

wherein R is selected from the group consisting of hydrogen and alkyl radicals having from 1 to 6 carbon atoms.

8. A catalyst according to claim 7 wherein said π-bonded organochromium compound is one of dibenzene chromium or dicumene chromium.

9. A catalyst according to claim 8 wherein said π-bonded organochromium compound is dicumene chromium, said cocatalyst is tri-n-butylborane present in an amount sufficient to give an atom ratio of boron to chromium within the range of 2:1 to 5:1, and wherein said phosphate-containing support is an aluminum phosphate-containing support activated in air at 400°–600° C.

10. A method of producing a catalyst comprising combining an aqueous solution of an aluminum salt with a source of phosphate ions and neutralizing with a base to give a hydrogel;
converting said hydrogel to a xerogel by one of azeotropic distillation or washing with a water miscible organic compound, activating by heating in an oxygen-containing ambient at a temperature within the range of 150°–800° C.; and
thereafter introducing a zerovalent chromium compound under anhydrous conditions.

11. A method of preparing a catalyst comprising combining an aluminum alkoxide with phosphoric acid to give a hydrogel;
converting said hydrogel to a xerogel, activating the resulting xerogel by heating at a temperature within the range of 150°–800° C.; and
thereafter introducing a zerovalent chromium compound under anhydrous conditions.

12. A method of producing a catalyst comprising treating a silica-containing material with a phosphating agent selected from phosphate ions and vaporized phosphorus compounds so as to give 0.001 to 0.2 gram atoms of phosphorus per mole of silica; activating the resulting treated silica at a temperature of 150°–1000° C.; and
thereafter introducing a zerovalent chromium compound under anhydrous conditions.

13. A method of producing a catalyst comprising coprecipitating silica and aluminum phosphate to form a hydrogel;
removing water from said hydrogel to form a xerogel, activating the resulting xerogel by heating at a temperature within the range of 150°–1000° C.; and
thereafter incorporating a zerovalent chromium compound under anhydrous conditions.

14. A method of producing a catalyst comprising impregnating silica with aluminum phosphate by combining a source of aluminum ions and phosphate ions with a slurry of silica in a diluent;
thereafter forming said aluminum phosphate by evaporating off the diluent, activating the thus-impregnated silica by heating at a temperature within the range of 150°–1000° C.; and thereafter introducing a zerovalent chromium compound under anhydrous conditions.

15. A method of producing a catalyst comprising
impregnating a silica xerogel with boron phosphate by adding a source of boron ions and a source of phosphate ions to a slurry of silica xerogel in a diluent;
thereafter evaporating off the diluent, activating the thus-impregnated silica by heating at a temperature of 150°–1000° C.; and
thereafter introducing a zerovalent chromium compound under anhydrous conditions.

16. A method of producing a catalyst comprising
precipitating aluminum phosphate in the presence of silica-alumina;
activating the resulting xerogel by heating in an oxygen-containing ambient at a temperature within the range of 150°–1000° C.; and
thereafter introducing a zerovalent chromium compound under anhydrous conditions.

17. A method of producing a catalyst comprising
activating a silica-alumina xerogel by heating in an oxygen-containing ambient at a temperature within the range of 150°–1000° C., activating an aluminum phosphate xerogel by heating in an oxygen-containing ambient at a temperature within the range of 150°–800° C.; and
thereafter introducing a zerovalent chromium compound onto said thus activated silica and said thus activated aluminum phosphate, said silica and aluminum phosphate either being physically mixed prior to said activation or combined subsequent to said activation.

18. A method of producing a catalyst comprising
phosphating an alumina-containing composition by treating same with a phosphating agent selected from (1) phosphate ions and (2) vaporous phosphorus compounds to give a surface composition having a 0.2:1 to 1:1 P/Al ratio;
activating said thus phosphated alumina composition by heating in an oxygen-containing ambient at a temperature within the range of 150°–800° C.; and
thereafter introducing a zerovalent chromium compound under anhydrous conditions.

19. A method of making a catalyst comprising forming an aluminum phosphate hydrogel, converting said hydrogel to a xerogel by azeotropic distillation or washing with a water miscible organic liquid, activating by heating at a temperature within the range of 150°–800° C. and thereafter introducing a zerovalent chromium compound under anhydrous conditions.

20. A catalyst produced by the method of claim 10.
21. A catalyst produced by the method of claim 11.
22. A catalyst produced by the method of claim 12.
23. A catalyst produced by the method of claim 13.
24. A catalyst produced by the method of claim 14.
25. A catalyst produced by the method of claim 15.
26. A catalyst produced by the method of claim 16.
27. A catalyst produced by the method of claim 17.
28. A catalyst produced by the method of claim 18.
29. A catalyst produced by the method of claim 19.

* * * * *